United States Patent [19]

Chabernaud

[11] Patent Number: 5,297,189
[45] Date of Patent: Mar. 22, 1994

[54] WIRELESS TELEPHONE SERVICE SUBSCRIPTION DATA USER ACCESS METHOD

[75] Inventor: Christian Chabernaud, Neuilly-Plaisance, France

[73] Assignee: Alcatel N.V., Amsterdam, Netherlands

[21] Appl. No.: 706,765

[22] Filed: May 29, 1991

[30] Foreign Application Priority Data

May 30, 1990 [FR] France ................. 90 06707

[51] Int. Cl.$^5$ .................................... H04M 11/00
[52] U.S. Cl. ........................... 379/58; 379/113; 379/114; 379/121
[58] Field of Search .............. 379/58, 59, 63, 91, 379/111–114, 119–121, 133–135, 137, 139, 357

[56] References Cited

FOREIGN PATENT DOCUMENTS 0358408  3/1990  European Pat. Off. .
0367361  5/1990  European Pat. Off. .
0158869  6/1989  Japan ..................... 379/114
0143670  6/1990  Japan ..................... 379/114

OTHER PUBLICATIONS

Commutational transmission article, "The Building of Intelligent Networks Architecture and Systems from Alcatel", No. 2 1989, Alcatel CAT, pp. 5–22.
M. Ballard et al., "Cellular Mobile Radio as an . . . ", Electrical Communication, Brussels, BE, vol. 63, No. 4, 1989, pp. 389–399.
S. Goerlinger et al., "Implementation of the Intelligent . . . ", Electrical Comm., Brussels, BE, vol. 63, No. 4, 1989, pp. 337–344.
M. Grenzhauser et al., "The Digital Mobile System D900-A Step . . . ", Int'l Switching Symp., Stockholm, SE, vol. 6, May 28, 1990, pp. 187–193.

Primary Examiner—Wing F. Chan
Assistant Examiner—Dwayne D. Bost
Attorney, Agent, or Firm—Robbins, Berliner & Carson

[57] ABSTRACT

Wireless telephone service is provided by a distribution network including fixed stations and wireless digital telephones linked by radio to the fixed stations, a digital public switching telephone network to which each fixed station is connected, service control points connected to the public switching telephone network and each including a wireless telephone service subscription database and a call processing logic device generating a call ticket at the end of each telephone call, and a service management system processing each call ticket to generate a billing ticket and including a reference database storing the characteristics of each subscription and all the billing tickets. A user data access method for this service includes storing and keeping up to date in real time in a reference database file of the service management system, billing tickets classified by subscription and, when a user requests access to subscription data: designating a subscription of interest, setting up a link between a user terminal and a server of the service management system, authenticating the identity of the user, reading billing tickets of the subscription in the file under the control of the user terminal, according to the user's access rights, and processing the information from the read billing tickets.

7 Claims, 2 Drawing Sheets

WIRELESS TELEPHONE SERVICE SUBSCRIPTION DATA USER ACCESS METHOD

BACKGROUND OF THE INVENTION

1. Field of the invention

The invention concerns a wireless telephone service subscription data user access method, said data essentially comprising the subscription characteristics and the billing data. A wireless telephone service is provided by a network essentially comprising: fixed stations; wireless telephones linked by radio to the fixed stations; and an integrated services digital public switched telephone network. The invention is more particularly concerned with a wireless telephone service provided by an intelligent network to be described later.

2. Description of the Prior Art

It is feasible to rent wireless telephones to short-term users, for example when an automobile is rented at a train station or an airport. Such rentals can be of very short duration, for example 24 hours. This situation is comparable with the renting of a fixed telephone as part of renting an hotel room. In the case of an hotel, the PABX of the hotel includes individual meters controlled by signals supplied by the network so that the amount of telephone charges incurred by a customer is shown in real time. The hotel management can therefore bill this amount when the customer wishes to check out of the hotel. In the case of wireless telephones, calls pass through fixed stations in diverse locations and it is therefore not possible for the renter to use this method to determine the amount of telephone charges incurred by a customer.

One known method of collecting billing data for a wireless telephone service consists in storing in each fixed station call tickets produced by the fixed station in respect of calls passing through it; this method consists in reading this data once each day and transmitting it to a management center. Billing tickets are generated in this center from the call tickets. For a user requiring to know the amount of charges incurred on a subscription, the time delay before billing tickets are available is the sum of the following times:

- the time for reading tickets in each fixed station from a management center;
- the time for processing all the billing tickets that the subscriber may have generated in all the fixed stations served by a management center, as billing must be comprehensive;
- the time for collating all billing tickets from other management centers, in cases where not all the fixed stations of a network are managed by the same management center, so that there is an additional transfer time and an additional processing time; and
- the time for the user to access the billing tickets via the sales office of the network operator.

Additionally, the subscription characteristics are not readily accessible to the subscriber. The subscriber who rents a wireless telephone to a customer cannot easily modify the subscription characteristics. For this reason, all valid subscriptions have the same characteristics. In other words, all subscribers have the same rights all the time, except for subscribers whose subscription has been blacklisted. It is not possible to customize the rights of each subscriber, for example to bar access to the international telephone network or to set a ceiling to prevent further use of the telephone when the amount of charges incurred has reached or exceeded the ceiling or to terminate use of the telephone at a predetermined date which is not the date at which the subscription expires.

One object of the invention is to propose a method that can be used in an intelligent network to enable a user to obtain very fast access to the data of a subscription using a standard terminal connected to the public switched telephone network and which makes provision for controlling such access to protect the data.

SUMMARY OF THE INVENTION

The invention consists in a wireless telephone service subscription data user access method, said service being provided by a network comprising:

- a distribution network comprising fixed stations and wireless digital telephones linked by radio to said fixed stations;
- a digital public switched telephone network to which each fixed station is connected;
- service control points connected to said public switched telephone network and each telephone service subscription database and a call processing logic device generating a call ticket at the end of each telephone call;
- a service management system processing each call ticket to generate a billing ticket and comprising a reference database storing the characteristics of each subscription and all said billing tickets;

which method consists in storing and keeping up to date in real time in a reference database file of the service management system billing tickets classified by subscription and, when a user requests access to subscription data using a terminal connected to a public switched telephone network and designating said subscription:

- setting up a link between said user terminal and a server of said service management system;
- authenticating the identity of said user;
- reading billing tickets of said subscription in said file under the control of said user terminal, according to the user's access rights; and
- processing the information from the read billing tickets.

This method provides very fast access to the billing tickets because they are generated in the service management system from call tickets which are generated in real time at the end of each telephone call; because each billing ticket is placed in real time in a file, subscription by subscription; and because a user can access the billing tickets of a subscription using a terminal connected to the public switched telephone network.

A preferred method in accordance with the invention further consists in reading and modifying some characteristics of said subscription under the control of said user terminal according to the user's access rights.

This method provides a user with very fast access to certain subscription characteristics because they are accessible in the reference database of the service management system and because a simple terminal connected to the public switched telephone network is sufficient for this.

A preferred method in accordance with the invention further consists in processing the information from said billing tickets in said service management system and then transmitting the results of such processing to said user terminal.

This method enables the user to determine, for example, the number of charging units incurred without needing to use an intelligent terminal capable of computing this number from the billing tickets. A simple ASCII or videotex (MINITEL) terminal can therefore be used.

A preferred method in accordance with the invention further consists in processing the information from said billing tickets in said user terminal which is an intelligent terminal loaded with software for processing information contained in said billing tickets.

This method enables each user to customize the processing of billing tickets, for example in order to draw up a bill for a person renting a wireless telephone.

A preferred method in accordance with the invention consists in, for reading and modifying some subscription characteristics or for reading billing tickets on the basis of the user's access rights:
  indicating to said user which data is accessible for reading and which data is accessible for writing, according to the user's access rights;
  processing an access request from said user terminal to read or write accessible data;
  sending to said terminal a "modification executed" acknowledgement in the case of a write access request which is processed immediately; and
  sending to said terminal a processing acknowledgement in the case of a write access request that is processed off-line.

This method provides particularly easy access even for unskilled users.

A preferred method in accordance with the invention further consists in, for authenticating the identity of the user:
  transmitting from said terminal to said service management system a password specific to said user;
  reading in said database of said service management system at least one password associated with said subscription; and
  verifying that the password transmitted matches a password associated with said subscription.

This method makes it possible to authenticate the identity of the user to provide some protection for the subscription data.

A preferred method in accordance with the invention further consists in, for authenticating the identity of the user:
  determining in a smart card connected to said terminal a first signature using a random number and a secret key specific to said user and transmitting said first signature to said service management system; and
  in said service management system:
    reading the data of said subscription in said reference database to recover said secret key associated with said subscription;
    computing a second signature using said secret key read from said subscription data and said random number; and
    comparing said first and second signatures, the identity of said user being authenticated if and only if they are identical.

BRIEF DESCRIPTION OF THE DRAWING

The invention will be better understood and other details of the invention will emerge more clearly from the following description given by way of non-limiting example only and with reference to the accompanying drawing in which.

DETAILED DESCRIPTION OF THE INVENTION

Figure 1:
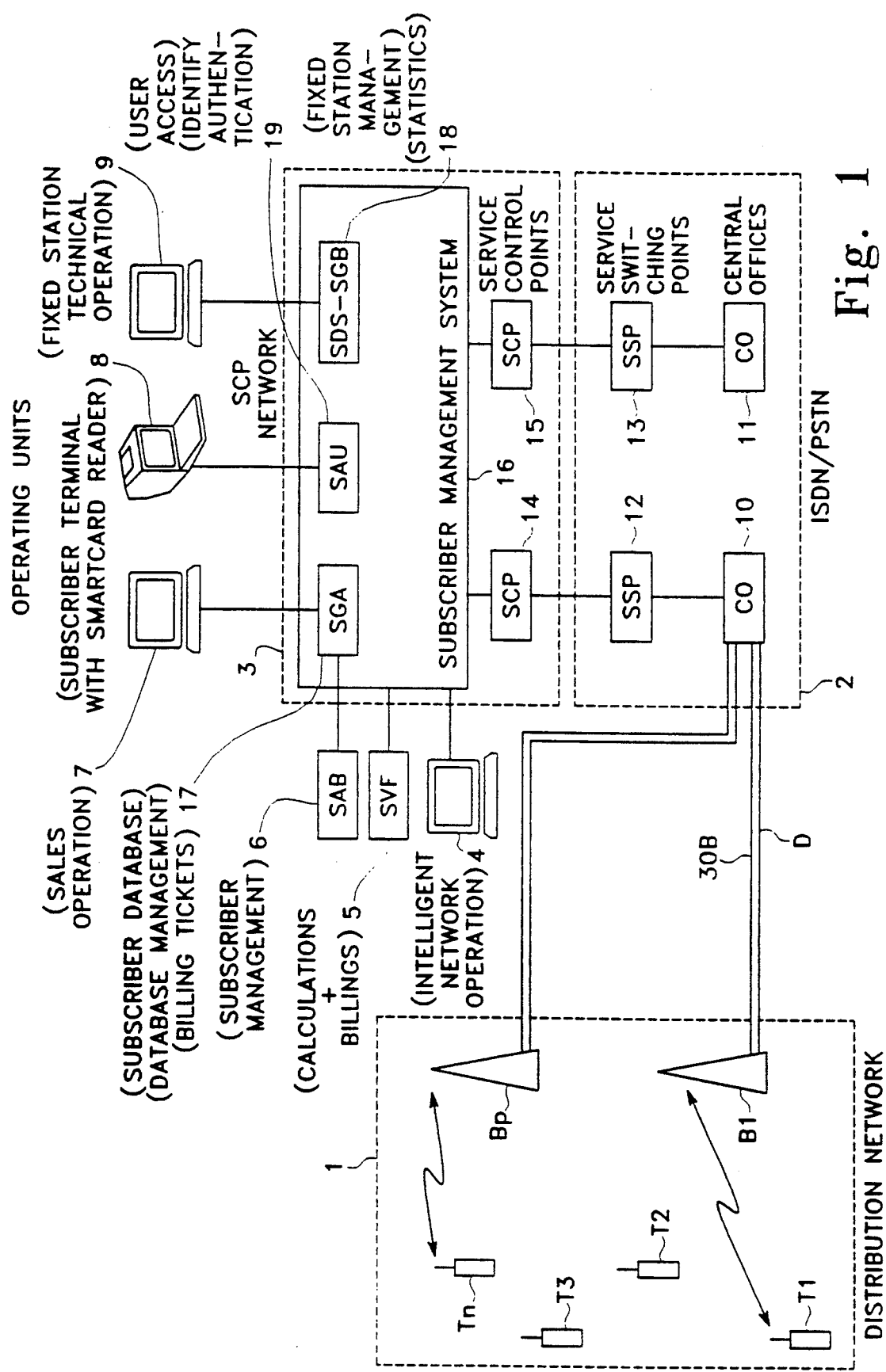
FIG. 1 is a block diagram of one example of a wireless telephone intelligent network in which the method in accordance with the invention can be implemented and FIG. 2 is a flow chart of an exemplary such method.
Figure 2:
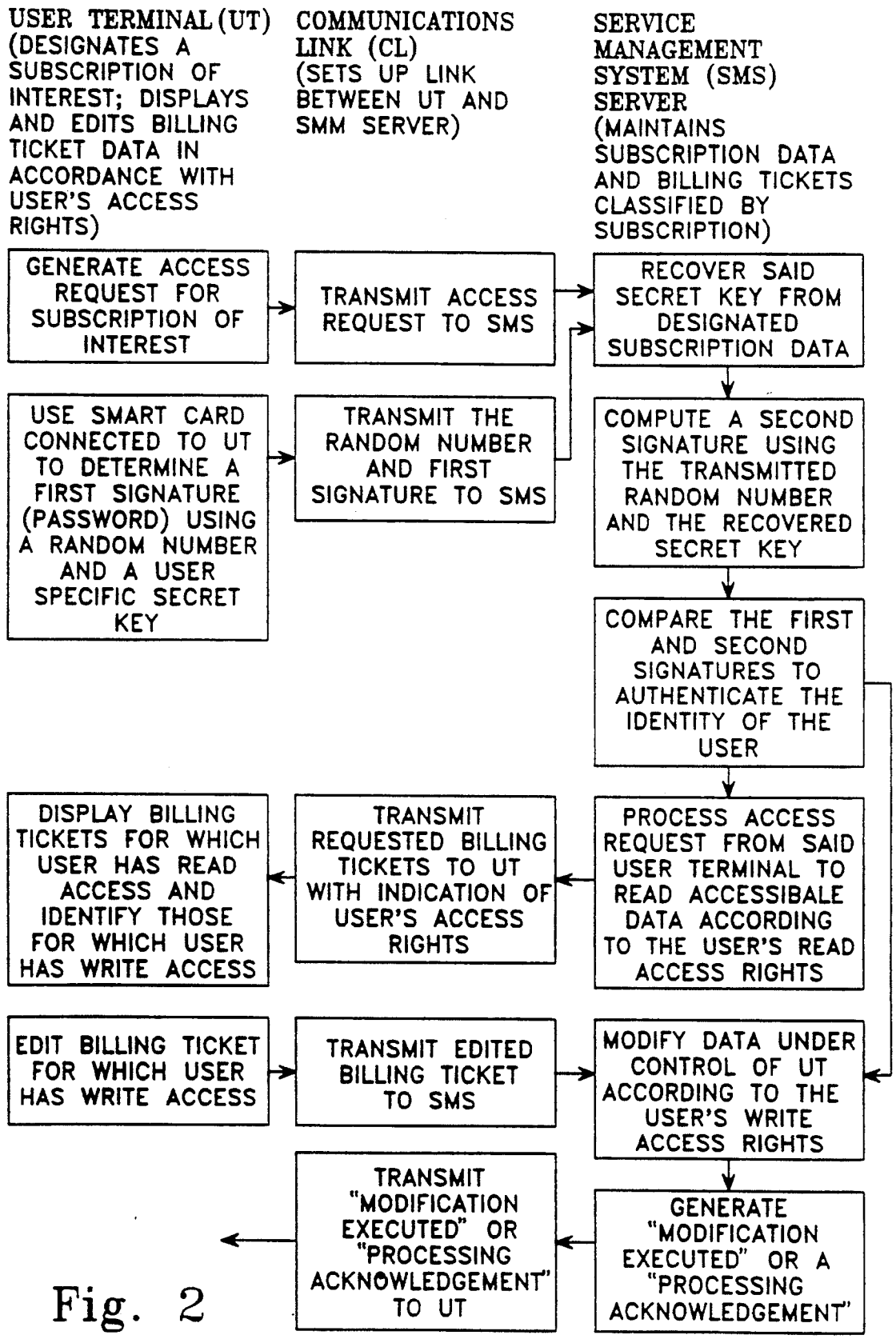

It comprises: a distribution network 1; an integrated services digital public switched telephone network 2; a service control point network 3; a subscriber management system 6; a calculation and billing system 5; and administration units 4, 7, 8 and 9.

The distribution network 1 comprises portable wireless digital telephones T1 through Tn and fixed stations B1 through Bp. Each telephone can be linked by radio to a nearby fixed station. Each fixed station B1 through Bp can service several (say 40) telephones a the same time and is connected by a cable to the public switched telephone network 2. Each standardized port to the network 2 provides a user signaling channel D and a number of telephone channels. The number of telephone channels can be 30, denoted 30B. In this example each mobile telephone is required to remain in the vicinity of the same fixed station throughout the duration of a call but the invention is equally applicable to a network enabling call handover from one fixed station to another adjacent fixed station to enable the mobile telephone to move around during a call.

The public switched telephone network 2 is made up of central offices (CO) and mobile services switching centers (SSP). In this example the network comprises two central offices 10 and 11 connected to respective mobile service switching centers 12 and 13 by CCITT No 7 signaling links. The fixed stations B1 through Bp are connected to the central office 10. In this example the service control point network 3 comprises two service control points (SCP) 14 and 15 and a service management system (SMS) 16. The network service control points 14 and 15 are connected to the respective mobile services switching centers 12 and 13 by CCITT No 7 signaling links and to the services management system 16 by CCITT X.25 links. The systems 5 and 6 and the operating units 4, 7, 8, 9 are connected to the SMS 16 by X.25 links.

Each operating unit 4, 7, 8 and 9 essentially comprises a screen-keyboard terminal. The terminals 4, 7, 9 are assigned to different administration teams, the service management system 16 providing information and dialogue resources for each team. The terminal 4 is assigned to the intelligent network technical operator. The terminal 9 is assigned to a technical operator of the set of fixed stations or of a particular subset of fixed stations. It accesses the database of the service management system 16 via a fixed station management server (SGB) and a statistics server (SDS) combined in a single unit 17. The terminal 7 is a videotex terminal assigned to the wireless telephone service sales operator. It accesses the service management system 16 via a subscriber management server (SGA) 17 which is also connected to the subscriber management system 16.

The videotex (Minitel) terminal 8 is connected temporarily to the network to enable a subscriber to access his subscription data to modify any subscription characteristics or to read billing tickets or amounts charged. It accesses the SMS 16 via a user access server (SAU) 18.

A call for service from a public network 2 user is analyzed in the mobile service switching center 12 or 13 and then passed to the respective service control point 14 or 15. The service control point then controls call processing and the mobile service switching center in respect of all actions requiring switching resources: for example: to send a recorded announcement, or to set up a connection between a network input and a network output, or to introduce a time-delay. Service control point software for each service organized as a string of basic actions processes each call on the basis of messages received. It also has access to a database updated in real time.

The service management system 16 is not involved in call processing. However, it contains in a database the service software and the subscriber data and therefore constitutes a reference source for the service. It handles technical administration of the network of fixed stations B1 through Bp and the network of service control points 14 and 15, in particular to maintain database consistency; it also handles commercial administration of the service: operator access; subscriber access; subscription database management; call ticket processing to generate billing tickets.

The service control points 14 and 15 and the service management system 16 may be in the form of an ALCATEL8300 multiprocessor marketed by the ALCATEL company, for example.

The service control points 14 and 15 implement the wireless telephone service access method. Each comprises a wireless telephone service subscriber database containing data relating to some or all service subscribers. It contains only data relevant to call processing. It does not contain all the data stored in the database of the service management system 16. The data is updated by the service management system 16 virtually simultaneously in all the databases of the service control points 14 and 15 immediately the service management system 16 is advised of a modification concerning subscribers by one of the operating centers 4, 7, 8 or 9.

The database of the service management system 16 includes, for each subscriber:
 a value designating the subscription;
 a value designating the service and the service operator for the subscription;
 the type of subscription: international authorizing all calls; or national authorizing calls in a single country; or selective authorizing a list of ten predetermined numbers;
 the ten numbers that the subscriber is authorized to access in the case of a selective type subscription;
 the account debit ceiling if an automatic limiting function is implemented in the service management system 16; and
 the expiry date of the subscription.

The database of the service management system 16 is a subset of the database of the subscriber management system 6 and these two databases are kept consistent with each other by coordinating updates from one database to the other. The sales operator uses his terminal 7 and the management server 17 to carry out updates including:
 creating subscriptions;
 deleting subscriptions;
 blacklisting and reinstating subscriptions;
 starting and stopping measurements on subscriptions;
 modifying subscription characteristics (subscription type, list of authorized numbers, value identifying a portable telephone, expiry date, etc).

An update can be carried out at the initiative of the service management system 16 to blacklist a subscription in certain cases such as exceeding a subscription billing account debit ceiling if this function is implemented in the service management system and if the subscriber has subscribed to this option.

The wireless telephone service subscriber can modify some subscription characteristics by connecting his videotex terminal 8 to the public switched telephone network and setting up a link to the user access server 18 which is a subset of the subscriber management server 17. The two servers carry out the same processes but a user has much more limited access rights than the network sales operator.

For example, if the user rents wireless telephones, it is beneficial to be able to:
 enable a telephone (instantaneously or off-line);
 disable a telephone (instantaneously or off-line);
 limit charging to a predetermined ceiling for a predetermined time (if this function is implemented in the service management system 16);
 modify the rights conferred by the subscription (the list of accessible services).

Above all else, however, it is beneficial for the user to be able to access billing data to:
 determine the number of charging units incurred by a subscription over a given period; and
 establish a detailed statement of use, call by call.

The network sales operator needs billing data only off-line. The billing data is conventionally transferred to the calculation and billing system 5 on magnetic tape for establishing itemized billing invoices off-line and at periods of, for example, two months.

When the method in accordance with the invention is used, the service management system 16 offers a fast billing service to subscribers who subscribe to this service which provides for: either access to the billing tickets if the user has an intelligent terminal with software for computing the billing amount from the billing tickets, and possibly further processes; or computing the number of charge units incurred by the subscription and listing calls over a period indicated by the user, this processing being carried out in the user access server 18 if the user has only a simple terminal.

The off-line billing service uses billing tickets generated by the service management system 16 in real time from call tickets sent by the service control points 14 and 15 at the end of each call. Each billing ticket includes:
 a value identifying the subscription;
 a value identifying the wireless telephone service;
 the called party number and the date and time of the call;
 the duration of the call;
 the number of basic charging units;
 the number identifying the fixed station used; and
 the subscription charging category, which determines a weekly or monthly charging ceiling.

The number of charging units incurred for a call is computed on the basis of a number of criteria including the location the calling party, the location of the called party, the time at which the call starts and ends, the applicable tariffs and the call type. This information is transmitted by the mobile services switching centers 12 and 13 to the service management system 16 over the signaling channels.

The service management system 16 processes the billing tickets as follows:
- syntax checks;
- formatting;
- sorting by subscription;
- preparing a magnetic tape on which all billing tickets are stored for transmission to the calculation and billing system 5 for off-line billing; and
- generating a fast billing ticket for only subscriptions entitled to the fast billing service and storing this ticket, subscription by subscription, in a file.

The fast billing ticket contains almost the same information as the billing ticket for off-line billing, but is used differently. The fast billing tickets are stored in the database of the service management system 16 in a file which is organized subscription by subscription and which can be consulted quickly by the user access server 18. It should be noted that the generation and processing of fast billing tickets applies to only a small minority of subscriptions, so that the additional workload they impose on the service management system 16 and on the subscriber management system 6 is acceptable.

When a user sets up a link to the server 18 his identity is authenticated by means of a confidential password that he enters on the keyboard of his terminal 8 and which is transmitted to the user access server 18. The password entered by the user is compared with a reference password for the subscription in question stored in the database of the service management system 16. The user's identity is authenticated if the password entered is identical to the reference password.

Different passwords can be associated with the same subscription for different users authorized to access the subscription data, possibly with different access rights. In this case the database stores multiple passwords and multiple access rights tables for the respective passwords and for the subscription concerned; the authentication procedure consists in comparing the password entered by a user with each of the passwords associated with the identified subscription and then consulting the table of access rights associated with the user password.

In one embodiment the user terminal 8 includes a smart card reader and the user is issued a smart card including a computing device using an encryption algorithm. This computing device stores a secret key specific to one user. The user inserts the smart card in the reader associated with the terminal 8. The user access server 18 sends a random number to the smart card which computes a signature based on this random number and on the secret key. It then sends this signature to the server 18 via the terminal. The server 18 calculates a reference signature using the same random number and a secret key associated with the subscription and stored in the database of the service management system 16. If the signature sent is identical to the reference signature the identity of the user is authenticated. This embodiment has the advantage of enhanced security as no confidential information passes between the server 8 and the server 18.

The database of the service management system 16 contains at least one access rights table for each subscription. When a user submits a request for access to the data of his subscription the server 18 authenticates the identity of the user, then consults the access rights table for that user, then guides the user to the data that is accessible according to this table, indicating data accessible only for reading and data accessible for reading and writing. The user then requests access to some of this data to read or write it.

The server 18 processes the request for read or write access to the accessible data. It sends to the terminal 8 a "modification executed" acknowledgement in the case of a write access request which is processed immediately. The server 18 can offer the user the facility to defer execution of a modification to a specified date and time. It then sends to the user terminal 8 a processing acknowledgement indicating that execution will be deferred.

When a user requests access to the billing data of a subscription the user access server 18 reads the subscription data to determine which option has been chosen in the subscription agreement. The user has a choice of two fast billing ticket processing options: processing in the server 18 or processing in the user terminal 8.

If the user has only a basic terminal it is unable to process the billing tickets. The user must then choose the first option and make do with predefined processing covering the main user requirements: computing the total number of charging units incurred over a given period and a list of calls and charges for the given period. The software for such processing will be obvious to those skilled in the art. The user access server 18 computes the number of charging units incurred by a subscription by adding the numbers of charging units indicated in the fast billing tickets for that subscription carrying a date between two limits specified by the user.

If the user has an intelligent terminal such as a personal computer and if the latter has been loaded with appropriate software the user can opt to process the fast billing ticket in his terminal. This software will be obvious to those skilled in the art. For example, the software might sort by call date and time the information contained in the billing tickets, compute the number and then the total amount of charges, list the calls and print out a bill. Carrying out this process in the user terminal enables the user to customize the processing of billing tickets to generate a bill for the person renting the telephone or to generate statistics or for any other purpose.

There is claimed:

1. Method for providing a user with access to subscription data in a wireless telephone service network including a distribution network having fixed stations and wireless digital telephones linked by radio to said fixed stations, a digital public switched telephone network to which each fixed station is connected, service control points connected to said public switched telephone network and each containing a wireless telephone service subscription database and a call processing logic device for generating a call ticket at the end of each telephone call, a service management system for processing each call ticket to generate a billing ticket and containing a reference database storing the characteristics of each subscription and all said billing tickets, said method comprising the steps:
- storing and keeping up to date in real time in a reference database file of the service management system, billing tickets classified by subscription;
- designating a subscription of interest;
- setting up a link between a user terminal to a server of said service management system;

using a smart card connected to said terminal to determine a first signature using a random number and a secret key specific to said user;

transmitting said first signature to said service management system;

reading the data of said subscription of interest in said reference database to recover said secret key associated with said subscription;

computing a second signature using said secret key read from said subscription data and said random number;

comparing said first and second signatures;

authenticating the identity of said user if and only if said first and second signatures are identical;

ascertaining the user's access rights;

reading billing tickets corresponding to said subscription of interest in said database file into the user terminal, according to the user's access rights thus ascertained; and processing the information from the billing tickets thus read.

2. Method according to claim 1 further comprising reading and modifying some characteristics of said subscription under the control of said user terminal according to the user's access rights.

3. Method according to claim 1 wherein
said processing step is performed within said service management system and
said method further comprises the additional step: using said link to transmit the results of such processing to said user terminal.

4. Method according to claim 1 wherein
said user terminal is an intelligent terminal loaded with software for processing information contained in said billing tickets, and
said processing step is performed within said service management system.

5. Method according to claim 1 further comprising, in order to read and modify some characteristics of said subscription, the additional steps:
indicating to said user which data is accessible for reading and which data is accessible for writing, according to the user's access rights;
processing an access request from said user terminal to read or write accessible data;
sending to said terminal a "modification executed" acknowledgement in the case of a write access request which is processed immediately; and
sending to said user terminal a processing acknowledgement in the case of a write access request that is processed off-line.

6. Method according to claim 1 further comprising to authenticate the identity of said user:
transmitting from said terminal to said service management system a password specific to said user;
reading in said database of said service management system at least one password associated with said subscription; and
verifying that the password transmitted matches a password associated with said subscription.

7. Method according to claim 1 further comprising, in order to read said billing tickets, the additional steps; indicating to said user which data is accessible for reading, according to the user's access rights; and
processing an access request from said user terminal to read accessible data.

* * * * *